(12) United States Patent
Hwang

(10) Patent No.: US 11,180,087 B2
(45) Date of Patent: Nov. 23, 2021

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Yonghwan Hwang, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/596,379

(22) Filed: Oct. 8, 2019

(65) Prior Publication Data

US 2021/0001781 A1 Jan. 7, 2021

(30) Foreign Application Priority Data

Jul. 1, 2019 (KR) .................. 10-2019-0078615

(51) Int. Cl.
*H04R 3/04* (2006.01)
*B60R 11/02* (2006.01)
*H04R 25/00* (2006.01)
*B60R 11/00* (2006.01)

(52) U.S. Cl.
CPC ........ *B60R 11/0217* (2013.01); *H04R 25/558* (2013.01); *B60R 2011/0012* (2013.01); *H04R 2499/13* (2013.01)

(58) Field of Classification Search
CPC .............................. H04R 1/24; H04R 2499/11
See application file for complete search history.

(56) References Cited

U.S. PATENT DOCUMENTS

| | | | | |
|---|---|---|---|---|
| 4,426,553 A * | 1/1984 | Senoo | ..................... | B60R 11/02 307/101 |
| 7,680,286 B2 * | 3/2010 | Hashimoto | ............. | H04S 7/307 381/86 |
| 8,675,892 B2 * | 3/2014 | Hogue | ..................... | H04R 3/14 381/99 |
| 9,084,070 B2 * | 7/2015 | Crockett | ................. | H04S 7/301 |
| 9,100,748 B2 * | 8/2015 | Hartung | ................... | H04R 3/12 |
| 9,118,290 B2 * | 8/2015 | Christoph | .............. | H03G 9/005 |
| 9,179,237 B2 * | 11/2015 | Pan | ........................... | H04S 7/00 |
| 9,893,697 B1 * | 2/2018 | Churchwell, II | ... | G10L 21/0224 |
| 2018/0101355 A1 * | 4/2018 | van Laack | ............. | H04R 1/403 |
| 2020/0037073 A1 * | 1/2020 | Augst | ..................... | G06F 3/017 |
| 2020/0053466 A1 * | 2/2020 | Wu | ......................... | H04R 5/04 |

FOREIGN PATENT DOCUMENTS

EP 0782369 A2 * 7/1997 ............. H04S 7/302
KR 10-2017-0135757 A 12/2017

* cited by examiner

*Primary Examiner* — Ryan Robinson
(74) *Attorney, Agent, or Firm* — Slater Matsil, LLP

(57) ABSTRACT

A vehicle and a method of controlling the vehicle are provided. The vehicle may include: a speaker configured to output a sound into the vehicle; a detector configured to measure internal environment information representing an environment inside the vehicle and a noise factor determining a noise generated in the vehicle; and a controller configured to determine a tuning value based on a type of sound, to adjust the tuning value to correspond to at least one of the internal environment information or the noise factor, to adjust the sound by adjusting at least one of a size or a phase based on the adjusted tuning value, and to control the speaker to output the adjusted sound.

18 Claims, 6 Drawing Sheets

VEHICLE AND METHOD OF CONTROLLING THE SAME

CROSS-REFERENCE TO RELATED APPLICATION

The present application claims priority to and the benefit of Korean Patent Application No. 10-2019-0078615, filed on Jul. 1, 2019, which is incorporated herein by reference in its entirety.

TECHNICAL FIELD

The present disclosure relates to a vehicle that adjusts a size or a phase of a sound output by a speaker into the vehicle, and a method of controlling the vehicle.

BACKGROUND

The statements in this section merely provide background information related to the present disclosure and may not constitute prior art.

Generally, a vehicle may apply a tuning value suitable for a specific vehicle environment to a sound output inside the vehicle through a speaker. That is, the vehicle may output the sound by adjusting at least one of a size or a phase of the sound based on a preset tuning value.

In addition, the vehicle may perform only a control of collectively raising a sound pressure of the sound at all frequencies by increasing a volume of the sound output when a noise occurs as the vehicle drives.

SUMMARY

The present disclosure provides a vehicle capable of outputting an optimum sound by changing a tuning value adaptively as an environment of the vehicle changes, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle includes a speaker configured to output a sound into the vehicle; a detector configured to measure internal environment information representing an environment inside the vehicle and a noise factor for determining a noise generated in the vehicle; and a controller configured to determine a tuning value based on a type of sound, to adjust the tuning value to correspond to at least one of the internal environment information or the noise factor, to adjust the sound by adjusting at least one of a size or a phase based on the adjusted tuning value, and to control the speaker to output the adjusted sound.

The internal environment information may include at least one of a position of each of a plurality of seats, a set angle of a backrest of each of the plurality of seats, whether a passenger or an object is positioned in each of the plurality of seats, an indoor temperature, whether each of a plurality of doors is opened or closed, and whether each of a plurality of windows is opened or closed.

The noise factor may include at least one of a driving position, a driving speed, a wind strength of an air conditioner, an outdoor temperature, or a total driving distance.

The controller may adjust the tuning value in a direction to cancel a peak and a deep in a frequency domain of the sound generated based on the internal environment information.

The controller may adjust the tuning value in a direction in which a frequency band of the sound corresponding to the frequency band of the noise generated based on the noise factor increases.

The controller may determine a target position of sound tuning inside the vehicle based on whether the passenger boards in each of the plurality of seats, and may adjust the tuning value to correspond to at least one of the internal environment information or the noise factor and the target position.

The speaker may include at least one tweeter configured to output a high frequency band of the sound; and at least one woofer configured to output a low frequency band of the sound.

The controller may is configured to adjust at least one of a size or a phase of the sound in a channel corresponding to each of the tweeter or the woofer based on the adjusted tuning value.

The vehicle may further include a microphone provided inside the vehicle. The may readjust the adjusted tuning value so that an internal sound corresponds to the adjusted sound when the internal sound received from the inside of the vehicle through the microphone is different from the adjusted sound.

The microphone is provided in each of a plurality of seats. The controller may determine a target position of sound tuning inside the vehicle based on whether a passenger boards in each of the plurality of seats, and may readjust the adjusted tuning value based on the internal sound at the target position.

In accordance with another aspect of the disclosure, in a method of controlling a vehicle, the vehicle includes a speaker configured to output a sound into the vehicle, and a detector configured to measure internal environment information representing an environment inside the vehicle and a noise factor for determining a noise generated in the vehicle. The method of controlling the vehicle includes determining a tuning value based on a type of sound; adjusting the tuning value to correspond to at least one of the internal environment information or the noise factor; adjusting the sound by adjusting at least one of a size or a phase based on the adjusted tuning value; and controlling the speaker to output the adjusted sound.

The internal environment information may include at least one of a position of each of a plurality of seats, a set angle of a backrest of each of the plurality of seats, whether a passenger or an object is positioned in each of the plurality of seats, an indoor temperature, whether each of a plurality of doors is opened or closed, and whether each of a plurality of windows is opened or closed.

The noise factor may include at least one of a driving position, a driving speed, a wind strength of an air conditioner, an outdoor temperature, or a total driving distance.

The adjusting of the tuning value to correspond to the internal environment information may include adjusting the tuning value in a direction to cancel a peak and a deep in a frequency domain of the sound generated based on the internal environment information.

The adjusting of the tuning value to correspond to the noise factor may include adjusting the tuning value in a direction in which a frequency band of the sound corresponding to the frequency band of the noise generated based on the noise factor increases.

The method may further include determining a target position of sound tuning inside the vehicle based on whether the passenger boards in each of the plurality of seats; and adjusting the tuning value to correspond to at least one of the internal environment information or the noise factor and the target position.

The speaker may include at least one tweeter configured to output a high frequency band of the sound; and at least one woofer configured to output a low frequency band of the sound.

The adjusting of the sound may include adjusting at least one of a size or a phase of the sound in a channel corresponding to each of the tweeter or the woofer based on the adjusted tuning value.

The vehicle may further include a microphone provided inside the vehicle. The method may further include readjusting the adjusted tuning value so that an internal sound corresponds to the adjusted sound when the internal sound received from the inside of the vehicle through the microphone is different from the adjusted sound.

The microphone is provided in each of a plurality of seats. The method may further include determining a target position of sound tuning inside the vehicle based on whether a passenger boards in each of the plurality of seats; and readjusting the adjusted tuning value based on the internal sound at the target position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
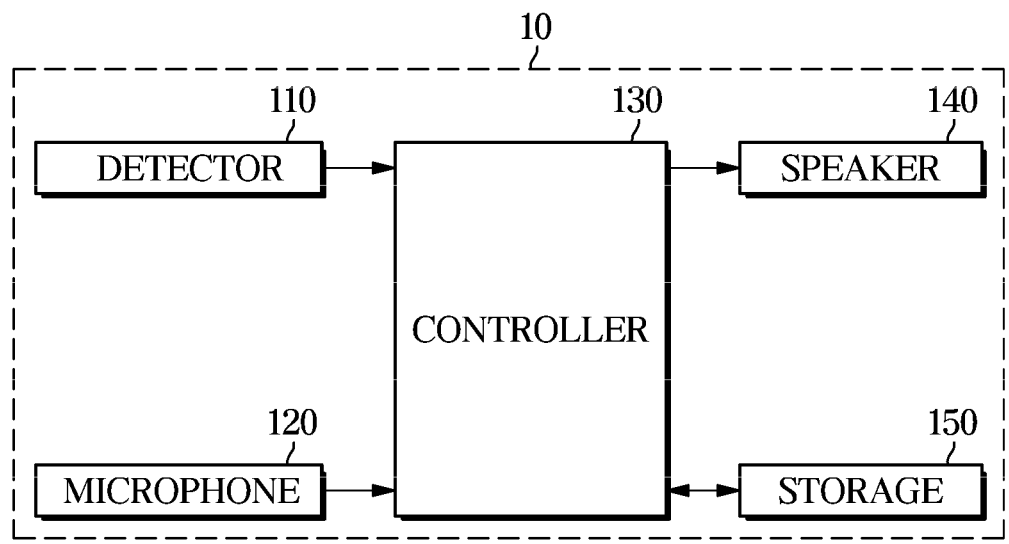
FIG. 1 is a control block diagram of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be understood that when a component is referred to as being "connected" to another component, it can be directly or indirectly connected to the other component. When a component is indirectly connected to another component, it may be connected to the other component through a wireless communication network.

Further, it will be understood that the terms "includes," "comprises," "including," and/or "comprising," when used in this specification, specify the presence of a stated component, but do not preclude the presence or addition of one or more other components.

Still further, it is to be understood that the singular forms "a," "an," and "the" include plural referents unless the context clearly dictates otherwise.

As used herein, the terms "portion," "unit," "block," "member," or "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process that is processed by a processor.

Reference numerals used in operations are provided for convenience of description, without describing the order of the operations, and the operations can be executed in a different order from the stated order unless a specific order is definitely specified in the context.

Hereinafter, a vehicle in some forms of the present disclosure and a method of controlling the vehicle will be described in detail with reference to the accompanying drawings.

Figure 2:
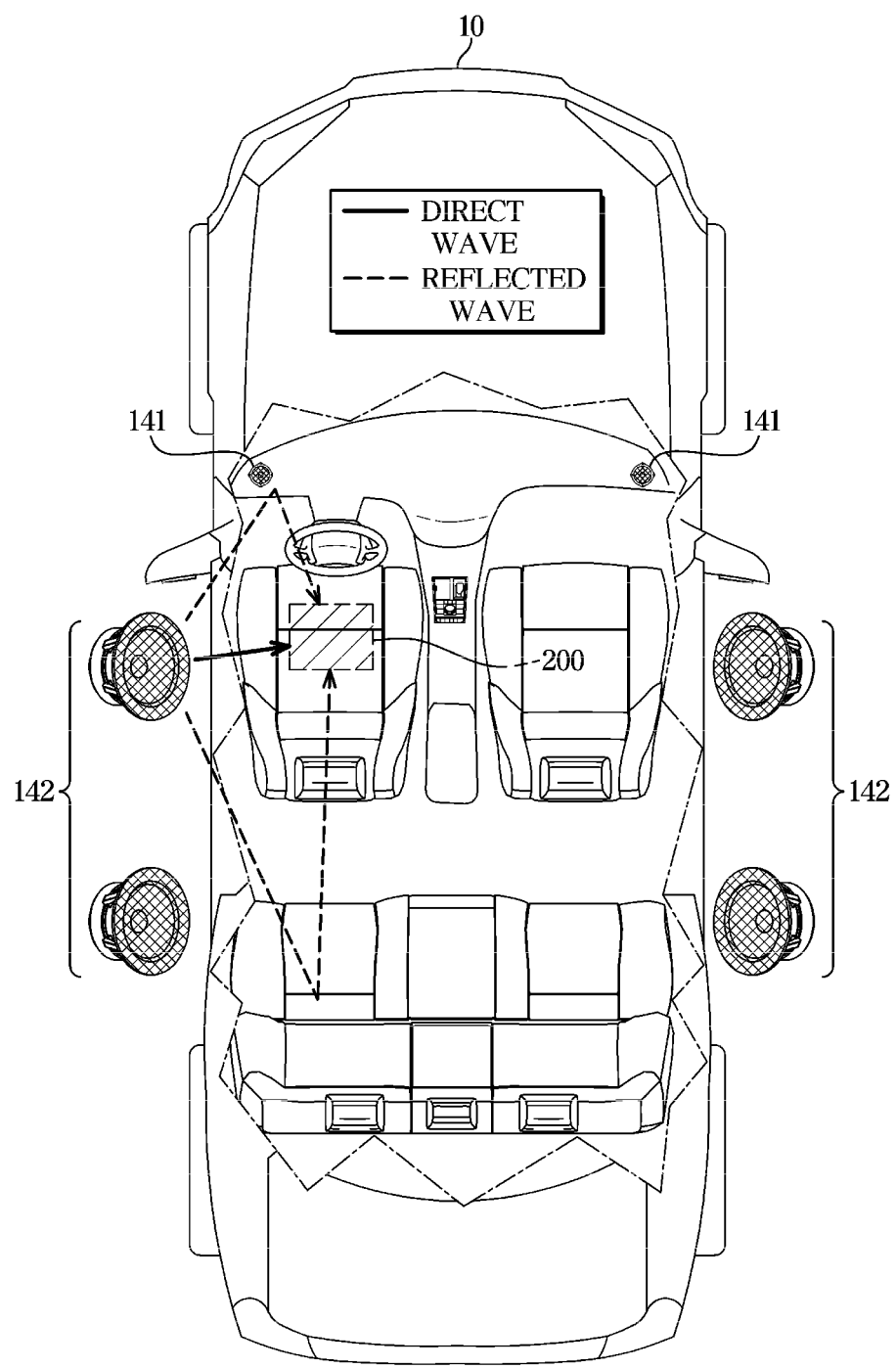
FIG. 2 is a view illustrating a case in which a speaker of a vehicle outputs a sound in one form of the present disclosure.

FIG. 1 is a control block diagram of a vehicle in some forms of the present disclosure, and FIG. 2 is a view illustrating a case in which a speaker of a vehicle outputs a sound in some forms of the present disclosure.

Referring to FIG. 1, a vehicle 10 may include a detector 110 for measuring internal environmental information representing an environment inside the vehicle 10 and a noise factor that determines a noise generated in the vehicle 10, a microphone 120 provided inside the vehicle 10 to receive a sound generated inside the vehicle 10, a controller 130 for determining a tuning value according to a type of sound for which output is required and adjusting the tuning value to correspond to at least one of internal environment information or the noise factor, a speaker 140 for outputting the sound into the vehicle 10, and a storage 150 for storing correlation information between the type of sound and the tuning value, correlation information between the internal environment information and the tuning value, and correlation information between the noise factor and the tuning value.

As illustrated in FIG. 2, the sound output through speakers 140 (141, 142) may be directly transmitted without reflection from the inside of the vehicle 10 to a specific position 200 (direct wave), or may be reflected and transmitted inside the vehicle 10 (reflected wave).

In this case, when a position of a seat is changed inside the vehicle 10, a measurement sound at the specific position 200 may be different from before the position change of the seat as a direct wave path or a reflected wave path of the sound is changed. As such, when the environment inside the vehicle 10 is changed, the measurement sound at the specific position 200 may be changed.

The internal environment information may be information about the environment affecting the sound when the sound is output inside the vehicle 10. The internal environment information may include, for example, at least one of a position of each of a plurality of seats (not shown), a set angle of a backrest (not shown) of each of the plurality of seats, whether a passenger or an object is positioned in each of the plurality of seats, an indoor temperature, whether each of a plurality of doors (not shown) is opened or closed, and whether each of a plurality of windows (not shown) is opened or closed.

However, the internal environment information is not limited to the above example, and may be included without limitation as long as it is about the environment affecting the sound when the sound is output from the inside of the vehicle 10, such as the material of the seat, the material of an interior material, and the presence or absence of an attachment to a windshield.

The detector 110 may include various sensors (not shown) for measuring the internal environment information, and may include a communication module (not shown) for communicating with switching modules for controlling configurations.

Particularly, the detector 110 may include the communication module (e.g., CAN communication, etc.) for communicating with a plurality of switching modules for controlling the seat, the door, and the window, respectively, for measuring the position of the seat, the angle of the backrest of the seat, the opening and closing of the door, and the opening and closing of the window, and a camera for measuring the seat, the door, and the window.

In addition, the detector 110 may include a pressure sensor based seat sensor for measuring whether the passenger or the object is positioned on the seat, and may include a temperature sensor for measuring the indoor temperature.

In the vehicle 10, the noise may be induced based on a road surface condition according to a driving position, a driving speed, a wind strength of an air conditioner (not shown), deformation of a component according to an external temperature, or aging of the component according to a total driving distance.

The noise factor is a factor for determining the type of noise, such as size or frequency, and the noise generated in the vehicle 10 may vary according to the change of the noise factor.

The noise factor may include at least one of the driving position, the driving speed, the wind strength of the air conditioner, an outdoor temperature, or the total driving distance. However, the noise factor is not limited to the above example and may be included without limitation as long as the noise factor is a factor that affects the noise generated in the vehicle 10.

The detector 110 may include various sensors (not shown) for measuring the noise factor, and may include the communication module (not shown) for communicating with the switching modules for controlling configurations.

Particularly, the detector 110 may include the communication module for receiving a GPS signal for measuring the driving position, and may include the communication module for communicating with the switching module for controlling the air conditioner.

In addition, the detector 110 may include an acceleration sensor for measuring the driving speed, the temperature sensor for measuring the outdoor temperature, and a wheel speed sensor for measuring the driving distance.

The microphone 120 may receive an internal sound generated inside the vehicle 10.

To this end, the microphone 120 may be provided inside the vehicle 10, and may be provided corresponding to each of the plurality of seats. However, the installation position of the microphone 120 is not limited as long as it can receive the internal sound, and the number of installation of the microphone 120 is also not limited.

The controller 130 may determine the tuning value based on the type of sound that is required to be output through the speaker 140. In this case, the tuning value is a value representing a degree of adjusting a size of a sound pressure according to the frequency of the sound. When the tuning value is applied to the sound, the sound may vary according to the frequency. That is, the sound to which the tuning value is applied may be adjusted in the size and phase.

Particularly, the controller 130 may apply a corresponding tuning value to a corresponding sound according to the type of sound such as a music, a guide sound, or a warning sound.

The controller 130 may adjust the tuning value determined according to the type of sound to correspond to at least one of the internal environment information or the noise factor.

That is, although the tuning value determined according to the type of sound is applied to the sound and output, the vehicle 10 may not obtain an intended tuning curve as the internal environment information or the noise factor changes.

Therefore, the controller 130 may adjust the tuning value determined according to the type of sound with the tuning value corresponding to the environment represented by the internal environment information based on the correlation information between the internal environment information and the tuning value.

In addition, the controller 130 may adjust the tuning value determined according to the type of sound with the tuning value corresponding to the noise represented by the noise factor based on the correlation information between the noise factor and the tuning value.

In some forms of the present disclosure, by applying both the tuning value corresponding to the internal environment information and the tuning value corresponding to the noise, the tuning value determined according to the type of sound may be adjusted.

At this time, the controller 130 may adjust the tuning value in a direction to cancel a peak and a deep in a frequency domain of the sound generated based on the internal environment information.

In addition, the controller 130 may adjust the tuning value in a direction in which a frequency band of the sound corresponding to the frequency band of the noise generated based on the noise factor increases.

Also, the controller 130 may determine a target position of sound tuning inside the vehicle 10 based on whether the passenger boards in each of the plurality of seats, and may adjust the tuning value to correspond to at least one of the internal environment information or the noise factor and the target position.

That is, the controller 130 may determine the target position where the passenger may receive the sound more effectively based on a boarding position of the passenger, and may adjust the tuning value based on information about the tuning value according to a pre-stored target position so that the tuning curve of the target sound may be formed at the target position.

When the internal sound received from the inside of the vehicle 10 through the microphone 120 is different from the sound to which the tuning value is adjusted to correspond to at least one of the internal environment information or the noise factor is applied, the controller 130 may readjust the adjusted tuning value so that the internal sound corresponds to the sound to which the tuning value is applied.

At this time, the controller 130 may determine the target position of the sound tuning inside the vehicle 10 based on whether the passenger boards in each of the plurality of seats, and may readjust the tuned value to correspond to at least one of the internal environment information and the noise factor.

When the tuning value is adjusted or readjusted, the controller 130 may apply the tuning value to the sound by adjusting at least one of size or phase based on the tuning value. That is, the controller 130 may adjust the sound based on the tuning value.

Thereafter, the controller 130 may control the speaker 140 to output the adjusted sound.

In this case, as illustrated in FIG. 2, the speaker 140 may include at least one tweeter 141 for outputting a high frequency band of the sound and at least one woofer 142 for outputting a low frequency band of the sound.

Accordingly, the controller 130 may adjust at least one of the size or phase of the sound in a channel corresponding to each of the tweeter 141 or the woofer 142 based on the adjusted tuning value.

The controller 130 may include at least one memory storing a program for performing the above-described operations and operations, which will be described below, and at least one processor for executing the stored program. When there are a plurality of the memories and processors, they may be integrated into one chip or provided at physically separated positions.

The storage 150 may include the correlation information between the type of sound and the tuning value, the correlation information between the internal environment information and the tuning value, the correlation information between the noise factor and the tuning value, and the correlation information between the target position and the tuning value.

In order words, the storage 150 may include information about the tuning value corresponding to the type of sound, and may include information about the tuning value set based on an experiment in the environment corresponding to the internal environment information.

In addition, the storage 150 may include information about the tuning value set based on the experiment in the noise according to the noise factor, and may include information about the tuning value set based on the experiment based on the target position.

The storage 150 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)), although not limited to these. The storage 250 may be used as the type of storage 150 as long as it can store various types of information.

In the above, each configuration of the vehicle 10 has been described. Hereinafter, the vehicle 10 will be described in detail to adjust the tuning value based on at least one of the internal environment information or the noise factor.

Figure 3:
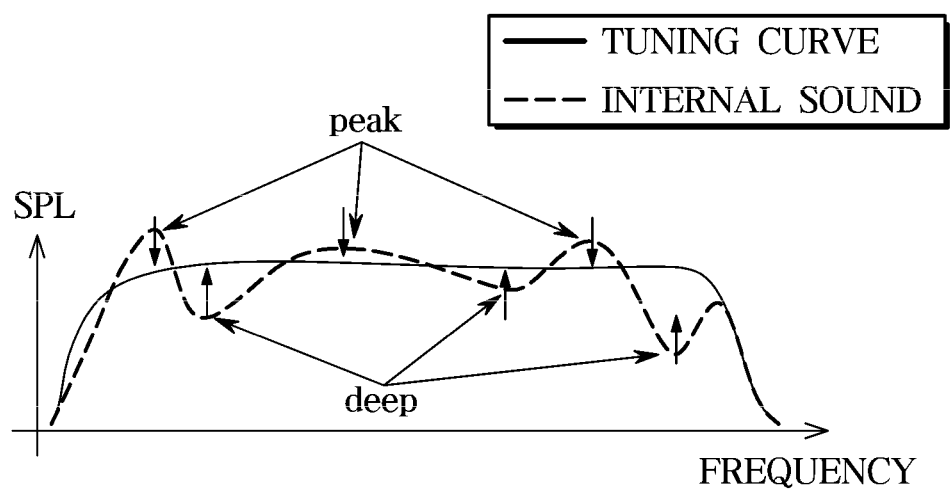
FIG. 3 is a view illustrating a case in which a vehicle adjusts a tuning value according to a change of internal environment information in one form of the present disclosure.
Figure 4:
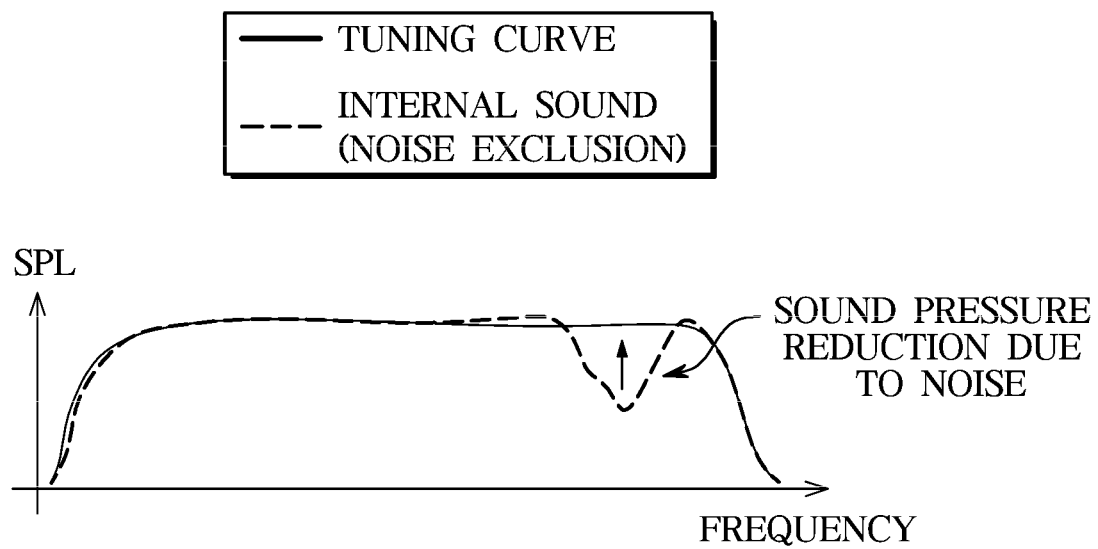
FIG. 4 is a view illustrating a case in which a vehicle adjusts a tuning value according to a change of a noise factor in one form of the present disclosure.

FIG. 3 is a view illustrating a case in which a vehicle adjusts a tuning value according to a change of internal environment information in some forms of the present disclosure, and FIG. 4 is a view illustrating a case in which a vehicle adjusts a tuning value according to a change of a noise factor in some forms of the present disclosure.

Referring to FIG. 3, as the environment changes inside the vehicle 10, the peak or the deep of the internal sound of the vehicle 10 may occur. At this time, the peak illustrates a higher sound pressure in a specific frequency band compared to the intended tuning curve, and the deep illustrates a lower sound pressure in the specific frequency band compared to the intended tuning curve.

For example, when the position of the seat is changed inside the vehicle 10, the measurement sound at the specific position 200 may be different from before the position change of the seat as the direct wave path or the reflected wave path of the sound is changed. As such, when the environment inside the vehicle 10 is changed, the measurement sound at the specific position 200 may be changed.

In order to solve this problem, the vehicle 10 may adjust the tuning value to correspond to the internal environment information obtained through the detector 110.

Particularly, The controller 130 may determine the tuning value based on the type of sound that is required to be output through the speaker 140, and may adjust the tuning value determined according to the type of sound with the tuning value corresponding to the environment represented by the internal environment information based on the correlation information between the internal environment information and the tuning value.

At this time, the controller 130 may adjust the tuning value in the direction to cancel the peak and the deep in the frequency domain of the sound generated based on the internal environment information.

Referring to FIG. 4, in the vehicle 10, the noise may be induced based on the road surface condition according to the driving position, the driving speed, the wind strength of the air conditioner, deformation of the component according to the external temperature, or aging of the component according to the total driving distance. At this time, the noise causes the lower sound pressure in the specific frequency band compared to the intended tuning curve. That is, the sound output through the speaker 140 due to the noise is canceled by the noise so that the sound pressure of the sound in the specific frequency band may be lowered.

To solve this problem, the vehicle 10 may adjust the tuning value to correspond to the noise factor obtained through the detector 110.

Particularly, The controller 130 may determine the tuning value based on the type of sound that is required to be output through the speaker 140, and may adjust the tuning value determined according to the type of sound with the tuning value corresponding to the environment represented by the internal environment information based on the correlation information between the noise factor and the tuning value.

The controller 130 may adjust the tuning value in the direction in which the frequency band of the sound corresponding to the frequency band of the noise generated based on the noise factor increases.

In some forms of the present disclosure, by applying both the tuning value corresponding to the internal environment information and the tuning value corresponding to the noise, the tuning value determined according to the type of sound may be adjusted.

Also, the controller 130 may determine the target position of sound tuning inside the vehicle 10 based on whether the passenger boards in each of the plurality of seats, and may adjust the tuning value to correspond to at least one of the internal environment information or the noise factor and the target position.

That is, the controller 130 may determine the target position where the passenger may receive the sound more effectively based on the boarding position of the passenger, and may adjust the tuning value based on information about the tuning value according to the pre-stored target position so that the tuning curve of the target sound may be formed at the target position.

When the internal sound received from the inside of the vehicle 10 through the microphone 120 is different from the sound to which the tuning value is adjusted to correspond to at least one of the internal environment information or the noise factor is applied, the controller 130 may readjust the adjusted tuning value so that the internal sound corresponds to the sound to which the tuning value is applied.

At this time, the controller 130 may determine the target position of the sound tuning inside the vehicle 10 based on whether the passenger boards in each of the plurality of seats, and may readjust the tuned value to correspond to at least one of the internal environment information and the noise factor.

When the tuning value is adjusted or readjusted, the controller 130 may apply the tuning value to the sound by adjusting at least one of size or phase based on the tuning value. That is, the controller 130 may adjust the sound based on the tuning value.

Thereafter, the controller 130 may control the speaker 140 to output the adjusted sound. That is, the controller 130 may adjust at least one of the size or phase of the sound in the channel corresponding to each of the tweeter 141 or the woofer 142 based on the adjusted tuning value.

Hereinafter, a control method of the vehicle 10 will be described. The vehicle 10 in some forms of the present disclosure may be applied to the control method of the vehicle 10. Therefore, descriptions given above with reference to FIGS. 1 to 4 may be applied to the control method of the vehicle 10 in the same manner, unless otherwise noted.

Figure 5:
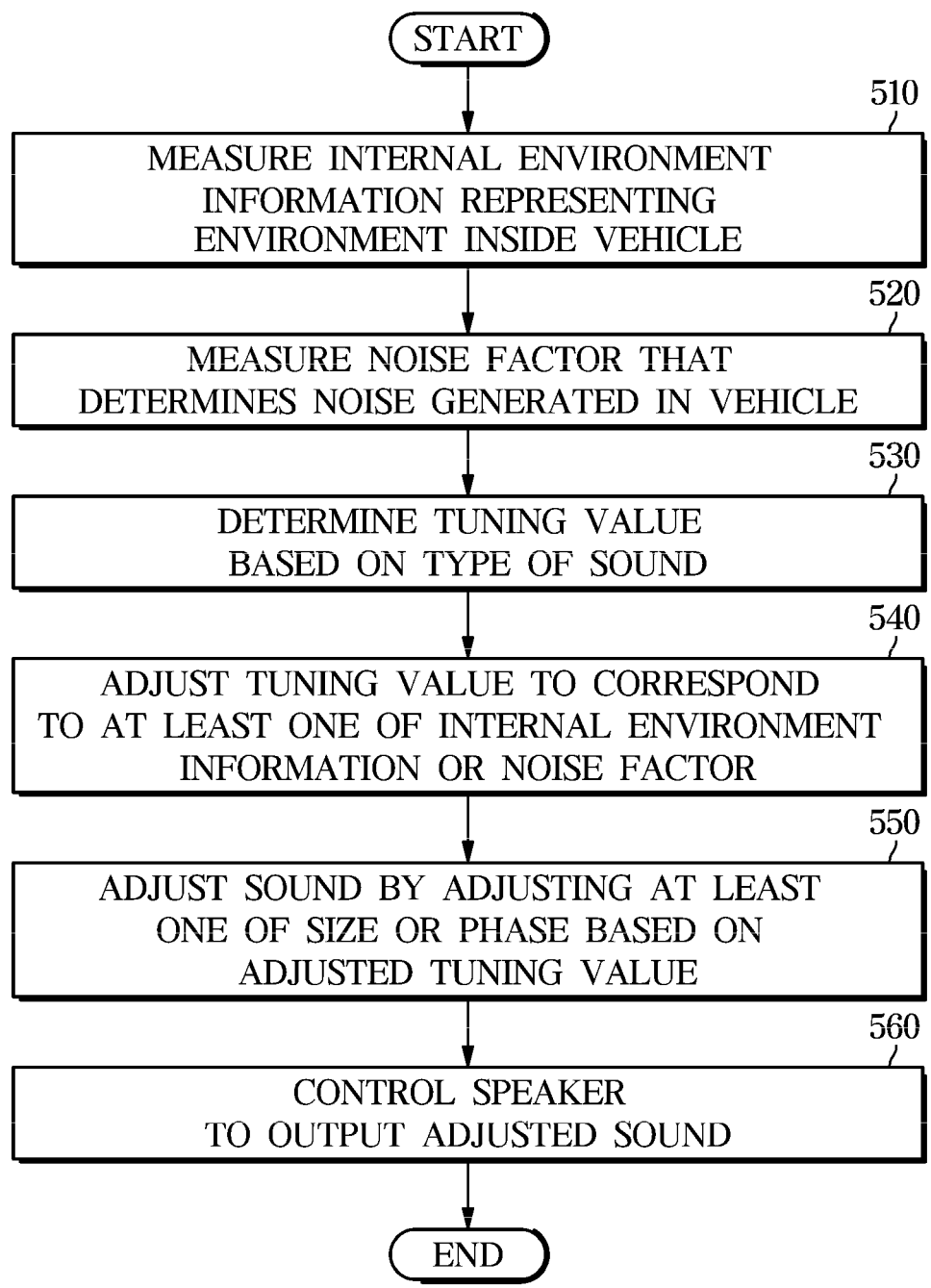
FIG. 5 is a flowchart illustrating a case in which a tuning value is adjusted in a control method of a vehicle in one form of the present disclosure.

FIG. 5 is a flowchart illustrating a case in which a tuning value is adjusted in a control method of a vehicle in some forms of the present disclosure.

Referring to FIG. 5, the vehicle 10 may measure the internal environment information representing the environment inside the vehicle 10 (510), and may measure the noise factor that determines the noise generated in the vehicle 10 (520).

The internal environment information may be information about the environment affecting the sound when the sound is output inside the vehicle 10. The internal environment information may include, for example, at least one of the position of each of the plurality of seats, the set angle of the backrest of each of the plurality of seats, whether the passenger or the object is positioned in each of the plurality of seats, the indoor temperature, whether each of the plurality of doors is opened or closed, and whether each of the plurality of windows is opened or closed.

The noise factor may include at least one of the driving position, the driving speed, the wind strength of the air conditioner, the outdoor temperature, or the total driving distance.

The vehicle 10 may determine the tuning value based on the type of sound (530). Particularly, the controller 130 may apply the corresponding tuning value to the corresponding sound according to the type of sound such as the music, the guide sound, or the warning sound based on the correlation information between the type of sound and the tuning value.

The vehicle 10 may adjust the tuning value to correspond to at least one of the internal environment information or the noise factor (540).

That is, although the tuning value determined according to the type of sound is applied to the sound and output, the vehicle 10 may not obtain the intended tuning curve as the internal environment information or the noise factor changes.

Therefore, the controller 130 may adjust the tuning value determined according to the type of sound with the tuning value corresponding to the environment represented by the internal environment information based on the correlation information between the internal environment information and the tuning value.

In addition, the controller 130 may adjust the tuning value determined according to the type of sound with the tuning value corresponding to the noise represented by the noise factor based on the correlation information between the noise factor and the tuning value.

In some forms of the present disclosure, by applying both the tuning value corresponding to the internal environment information and the tuning value corresponding to the noise, the tuning value determined according to the type of sound may be adjusted.

The vehicle 10 may adjust the sound by adjusting at least one of the size or phase based on the adjusted tuning value (550), and may control the speaker 140 to output the adjusted sound (560).

Figure 6:
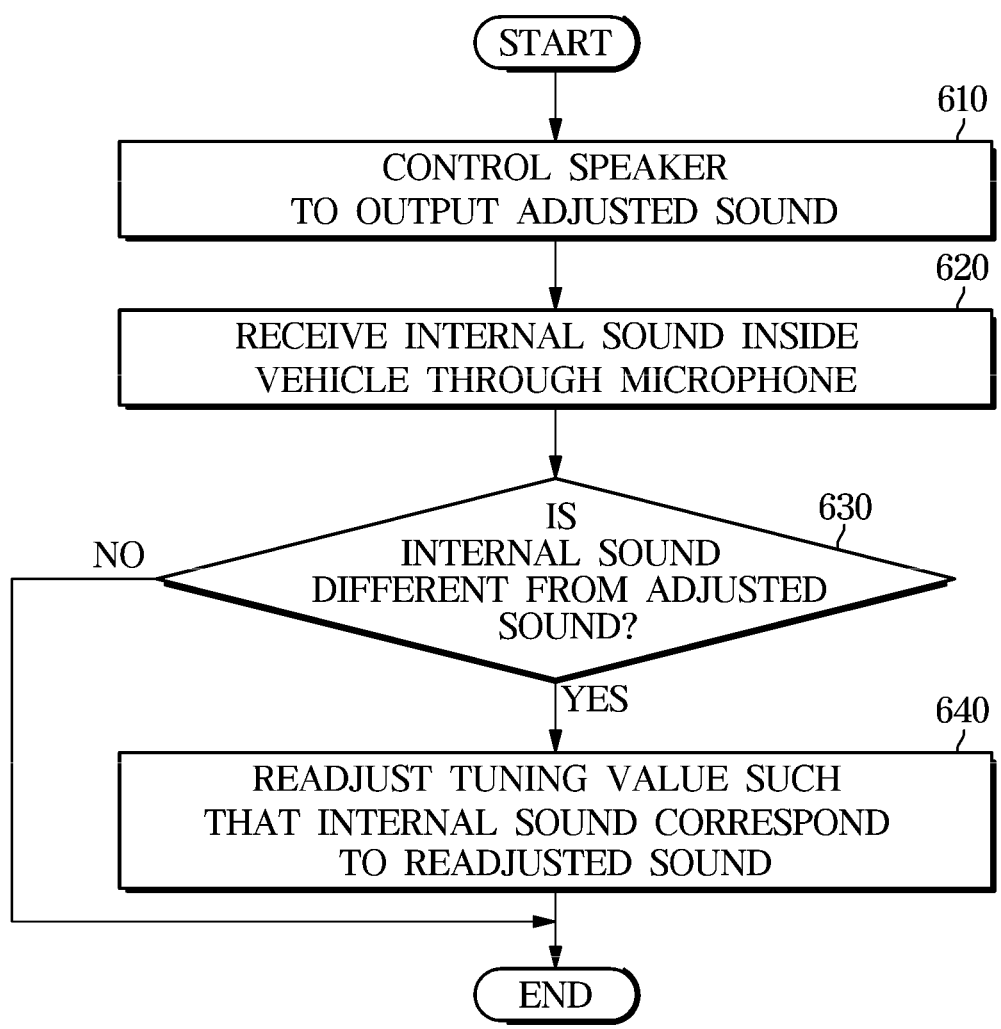
FIG. 6 is a flowchart illustrating a case in which a tuning value is readjusted in a control method of a vehicle in one form of the present disclosure.

FIG. 6 is a flowchart illustrating a case in which a tuning value is readjusted in a control method of a vehicle in some forms of the present disclosure.

Referring to FIG. 6, the vehicle 10 may control the speaker 140 to output the adjusted sound (610).

That is, the controller 130 may adjust the sound by adjusting at least one of the size or the phase based on the tuning value adjusted to correspond to at least one of the internal environment information or the noise factor, and may control the speaker 130 to output the adjusted sound.

The vehicle 10 may receive the internal sound inside the vehicle 10 through the microphone 120 (620). When the internal sound is different from the adjusted sound (YES in 630), the vehicle 10 may readjust the tuning value such that the internal sound correspond to the readjusted sound (640).

At this time, the controller 130 may determine the target position of the sound tuning inside the vehicle 10 based on whether the passenger boards in each of the plurality of seats, and may readjust the tuned value to correspond to at least one of the internal environment information and the noise factor.

As is apparent from the above description, the vehicle and the method of controlling the vehicle in some forms of the present disclosure, by changing the tuning value adaptively as an environment of the vehicle changes, it is possible to adaptively provide an optimum sound to the user.

Meanwhile, some forms of the present disclosure may be implemented in the form of a recording medium storing instructions that are executable by a computer. The instructions may be stored in the form of a program code, and when executed by a processor, the instructions may generate a program module to perform operations of some forms of the present disclosure. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

The description of the disclosure is merely exemplary in nature and, thus, variations that do not depart from the substance of the disclosure are intended to be within the

What is claimed is:

1. A vehicle comprising:
   a speaker configured to output a sound into the vehicle;
   a detector configured to measure internal environment information representing an environment inside the vehicle and a noise factor representing a noise generated in the vehicle; and
   a controller configured to:
      determine a tuning value based on a type of sound;
      adjust the tuning value to correspond to at least one of the internal environment information or the noise factor;
      adjust the tuning value to cancel a peak and a deep in a frequency domain of the sound that is generated based on the internal environment information;
      adjust the sound by adjusting at least one of a size or a phase based on the adjusted tuning value; and
      control the speaker to output the adjusted sound,
   wherein the internal environment information comprises an indoor temperature, whether each door of a plurality of doors is opened or closed, and whether each window of a plurality of windows is opened or closed.

2. The vehicle of claim 1, wherein the internal environment information further comprises at least one of a position of each seat of a plurality of seats, a set angle of a backrest of each seat of the plurality of seats, or whether a passenger or an object is positioned in each seat of the plurality of seats.

3. The vehicle of claim 1, wherein the noise factor comprises at least one of a driving position, a driving speed, a wind strength of an air conditioner, an outdoor temperature, or a total driving distance.

4. The vehicle of claim 1, wherein the controller is configured to:
   adjust the tuning value such that a frequency band of the sound increases corresponding to the frequency band of the noise that is generated based on the noise factor.

5. The vehicle of claim 1, wherein the controller is configured to:
   determine a target position of sound tuning inside the vehicle depending on whether the passenger is sitting in each seat of the plurality of seats; and
   adjust the tuning value to correspond to the target position and at least one of the internal environment information or the noise factor.

6. The vehicle of claim 1, wherein the speaker comprises:
   at least one tweeter of a plurality of tweeters configured to output a high frequency band of the sound; and
   at least one woofer of a plurality of woofers configured to output a low frequency band of the sound.

7. The vehicle of claim 6, wherein the controller is configured to:
   adjust at least one of a size or a phase of the sound in a channel corresponding to each tweeter of the plurality of tweeters or each woofer of the plurality of woofers based on the adjusted tuning value.

8. The vehicle of claim 1, wherein the vehicle further comprises:
   a plurality of microphones provided inside the vehicle,
   wherein the controller is configured to readjust the adjusted tuning value such that an internal sound corresponds to the adjusted sound when the internal sound received from the inside of the vehicle through the plurality of microphones is different from the adjusted sound.

9. The vehicle of claim 8, wherein the plurality of microphones is provided in each seat of a plurality of seats, and
   wherein the controller is configured to:
      determine a target position of sound tuning inside the vehicle depending on whether a passenger is sitting in each seat of the plurality of seats; and
      readjust the adjusted tuning value based on the internal sound at the target position.

10. A method of controlling a vehicle, the method comprising:
    determining, by a controller, a tuning value based on a type of sound;
    adjusting, by the controller, the tuning value to correspond to at least one of internal environment information or a noise factor, wherein the internal environment information is an environment inside the vehicle, and the noise factor represents a noise generated in the vehicle;
    adjusting, by the controller, the tuning value to cancel a peak and a deep in a frequency domain of the sound that is generated based on the internal environment information;
    adjusting, by the controller, the sound by adjusting at least one of a size or a phase based on the adjusted tuning value; and
    controlling, by the controller, a speaker to output the adjusted sound,
    wherein the internal environment information comprises an indoor temperature, whether each door of a plurality of doors is opened or closed, and whether each window of a plurality of windows is opened or closed.

11. The method of claim 10, wherein the internal environment information further comprises at least one of a position of each seat of a plurality of seats, a set angle of a backrest of each seat of the plurality of seats, or whether a passenger or an object is positioned in each seat of the plurality of seats.

12. The method of claim 10, wherein the noise factor comprises at least one of a driving position, a driving speed, a wind strength of an air conditioner, an outdoor temperature, or a total driving distance.

13. The method of claim 10, wherein adjusting the tuning value to correspond to the noise factor comprises:
    adjusting the tuning value such that a frequency band of the sound increases corresponding to the frequency band of the noise that is generated based on the noise factor.

14. The method of claim 10, wherein the method further comprises:
    determining a target position of sound tuning inside the vehicle depending on whether the passenger is sitting in each seat of the plurality of seats; and
    adjusting the tuning value to correspond to the target position and at least one of the internal environment information or the noise factor.

15. The method of claim 10, wherein the speaker comprises:
    at least one tweeter of a plurality of tweeters configured to output a high frequency band of the sound; and
    at least one woofer of a plurality of woofers configured to output a low frequency band of the sound.

16. The method of claim 15, wherein adjusting the sound comprises:

adjusting at least one of a size or a phase of the sound in a channel corresponding to each tweeter of the plurality of tweeters or each woofer of the plurality of woofers based on the adjusted tuning value.

17. The method of claim 10, wherein the method further comprises:
readjusting the adjusted tuning value such that an internal sound corresponds to the adjusted sound when the internal sound received from the inside of the vehicle through a plurality of microphones is different from the adjusted sound, wherein the plurality of microphones is provided inside the vehicle.

18. The method of claim 17, wherein the method further comprises:
determining a target position of sound tuning inside the vehicle based on whether a passenger is sitting in each seat of the plurality of seats, wherein the plurality of microphones is provided in each seat of the plurality of seats; and
readjusting the adjusted tuning value based on the internal sound at the target position.

* * * * *